(12) United States Patent
Abusleme et al.

(10) Patent No.: US 6,201,084 B1
(45) Date of Patent: Mar. 13, 2001

(54) VDF THERMOPLASTIC COPOLYMER

(75) Inventors: Julio A. Abusleme, Saronno; Giulio Brinati, Milan, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 08/885,869

(22) Filed: Jun. 30, 1997

(30) Foreign Application Priority Data

Jul. 1, 1996 (IT) ............................................. MI96A1343

(51) Int. Cl.⁷ .............................. C08F 14/18; C08F 34/02
(52) U.S. Cl. ........................ 526/247; 526/206; 526/209; 526/210
(58) Field of Search .................................. 526/247, 209, 526/210, 243, 206

(56) References Cited

U.S. PATENT DOCUMENTS

| | | | |
|---|---|---|---|
| 3,978,030 | * 8/1976 | Resnik et al. | 526/247 |
| 4,025,709 | * 5/1977 | Blaise et al. | 525/276 |
| 4,076,929 | * 2/1978 | Dohany | 526/210 |
| 4,360,652 | * 11/1982 | Dohany | 526/210 |
| 4,565,855 | * 1/1986 | Anderson et al. | 526/247 |
| 4,569,978 | * 2/1986 | Barber | 526/206 |
| 4,594,399 | * 6/1986 | Anderson et al. | 526/247 |
| 4,789,717 | * 12/1988 | Giannetti | 526/209 |
| 4,864,006 | * 9/1989 | Giannetti | 526/209 |
| 4,946,900 | * 8/1990 | Blaise et al. | 525/276 |
| 4,946,902 | * 8/1990 | Bekiarian et al. | 525/326.2 |
| 5,093,427 | * 3/1992 | Barber | 526/206 |
| 5,498,682 | * 3/1996 | Navarrini et al. | 526/247 |
| 5,589,557 | * 12/1996 | Navarrini et al. | 526/247 |
| 5,597,880 | * 1/1997 | Abusleme et al. | 526/247 |
| 5,646,223 | * 7/1997 | Navarrini et al. | 526/247 |

FOREIGN PATENT DOCUMENTS

| | | | |
|---|---|---|---|
| 0080187 | * | 6/1983 | (EP) . |
| 0095077 | * | 11/1983 | (EP) . |
| 526216 | * | 2/1993 | (EP) . |
| 625526 | * | 11/1994 | (EP) . |
| 633257 | * | 1/1995 | (EP) . |
| 650982 | * | 5/1995 | (EP) . |
| 697766 | * | 2/1996 | (EP) . |
| 0712882 | * | 5/1996 | (EP) . |

\* cited by examiner

*Primary Examiner*—David W. Wu
*Assistant Examiner*—Tanya Zalukaeva
(74) *Attorney, Agent, or Firm*—Arent, Fox Kintner Plotkin & Kahn

(57) ABSTRACT

Vinylidenfluoride (VDF) thermoplastic copolymers, consisting of
(a) from 0.1 to 10% by moles, preferably from 0.5 to 5%, of one or more fluorodioxoles of formula:

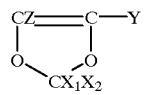

(I)

wherein Y is equal to $OR_f$ wherein $R_f$ is a perfluoroalkyl having from 1 to 5 carbon atoms, or Y=Z as defined hereinunder; Y is preferably equal to $OR_f$; $X_1$ and $X_2$, equal to or different from each other, are —F or —$CF_3$; Z is selected from —F, —H, —Cl;
(b) VDF, being the remaining part to 100% by moles.

2 Claims, No Drawings

VDF THERMOPLASTIC COPOLYMER

The present invention relates to polyvinylidenfluoride having improved impact resistance.

In particular it refers to vinylidenfluoride thermoplatic copolymers.

It is well known that polyvinylidenfluoride (PVDF) is a crystalline polymer endowed with good properties of chemical and mechanical resistance, however it shows a marked brittleness and a clear tendency to the brittle fracture.

Therefore its employment where a good impact resistance and/or absence of brittle fracture, is required, for instance for the manufacture of structural elements (self-supporting pipes, flanges and the like) has various inconveniences and practically its use is limited to low thicknesses.

It is also known to improve the impact resistance of the PVDF homopolymer by copolymerization of vinylidenfluoride (VDF) with another fluoro-containing olefin as initial part of the monomer feeding in the autoclave or continuously fed with a fixed ratio with respect to VDF consumption. See for instance European patent EP 526216, examples 6 and 9; and the patents U.S. Pat. No. 4,569,978 example 15, repeated also in U.S. Pat. No. 5,093,427 (example 1 comparative). In particular the comonomer used is the hexafluoropropene (HFP) in amounts generally comprised between about 0.3 and 100% by moles.

The drawbacks of such processes reside in the fact that there is a decrease of the rating temperature of the material due to the lowering of the second melting temperature of the product.

To obviate this inconvenience, U.S. Pat. No. 5,093,427 suggests the addition of hexafluoropropene in autoclave after having consumed an amount of about 50–90% by weight of the total VDF used in polymerization. In this way one succeeds in substantially maintaining the second melting temperature of the homopolymer and therefore to keep the maximum rating temperature.

It is to be noticed, however, that the use of HFP as comonomer brings to a decay of the mechanical properties, such as for instance the elastic modulus and the yield-stress especially at high temperatures (150° C.).

The Applicant has now unexpectedly and surprisingly found that by using particular comonomers as specified hereunder it is possible to obtain VDF thermoplastic polymers having an improved impact resistance while maintaining the rating temperature of the homopolymer combined with good mechanical properties even at high temperatures.

An object of the present invention consists therefore in vinylidenfluoride (VDF) thermplastic copolymers, comprising:

(a) from 0.1 to 10% by moles, preferably from 0.5 to 5%, of one or more fluorodioxoles of formula:

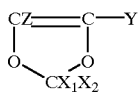

(I)

wherein Y is equal to $OR_f$ wherein $R_f$ is a perfluoroalkyl having from 1 to 5 carbon atoms, or Y=Z as defined hereinunder; Y is preferably equal to $OR_f$; $X_1$ and $X_2$, equal to or different from each other, are —F or —CF$_3$; Z is selected from —F, —H, —Cl;

(b) VDF being the remaining part to 100% by moles.

Preferably in the formula (I) $X_1$, $X_2$ and Z are —F; $R_f$ is preferably —CF$_3$, —C$_2$F$_5$, or —C$_3$F$_7$. The fluorodioxoles of formula (I) wherein Y is equal to $OR_f$ in which $R_f$ is —CF$_3$ and $X_1$, $X_2$ and Z are —F, are particularly preferred. This product is indicated hereinafter as TTD (2,2,4-trifluoro-5-trifluoro-metoxy-1,3-dioxole).

The fluorodioxole of formula (I) are described in U.S. Pat. No. 5,498,682 in the name of the Applicant, the content of which is incorporated herein by reference.

The copolymers of the present invention can be synthesized by copolymerizing VDF with fluorodioxoles also by introducing the comonomer at the beginning of the polymerization.

Another process that can be mentioned consists in adding the comonomer according to the system described in U.S. Pat. No. 5,093,427, herein incorporated by reference, i.e. the addition of the fluorodioxole in autoclave is carried out after having consumed an amount of about 50–90% by weight of the total VDF used in the polymerization.

The copolymers object of the present invention can be prepared according to known techniques, by copolymerizing the corresponding monomers, in suspension with or without water or in aqueous emulsion in the presence of a suitable radical initiator, at a temperature generally comprised from −40° C. to 130° C., preferably from −15° C. to 100° C., more preferably from −10° C. to 70° C. The reaction pressure is generally comprised between 0.5 anmd 150 bar, preferably betweem 2 and 90 bar.

Any product capable of generating active radicals at the chosen (co)polymerization temperature, can be employed as initiator. It can be chosen for instance from: inorganic peroxides, such as for instance sodium, potassium or ammonium peroxydisulphate; dialkylperoxides, such as for instance diterbutylperoxide (DTBP); dialkylperoxydicarbonates, such as for instance diethyl- and diisopropyl-peroxydicarbonate (IPP), bis-(4-t-butyl-cyclohexyl)-peroxydicarbonate; t-alkylperoxybenzoates; t-alkylperoxy-pivalates, such as for instance t-butyl and t-amyl perpivalate; acetylcyclohexansulphonyl peroxide; dibenzoyl peroxide; dicumylperoxide.

The amount of the radical initiator in reaction is the usual one for the copolymerization of fluoro-containing olefinic monomers, and is generally comprised between 0.003% and 4% by weight with respect to the total amount of (co)polymerized monomers.

The reaction is usually carried out in the presence of a suitable surfactant, see for instance those described in U.S. Pat. No. 4,360,652 and U.S. Pat. No. 4,025,709, so as to give a stable emulsion. They are generally fluoro-containing surfactants, chosen from the products of the general formula

wherein $R_f$ is a (per)fluoroalkyl chain $C_5$–$C_{14}$ or a (per)fluoropolyoxyalkylenic chain, $X^-$ is —COO$^-$ or —SO$_3^-$, $M^+$ is chosen from $H^+$, $NH_4^+$, an alkaline metal ion. Among the most commonly used we remember: ammonium perfluoro-octanoate; (per)fluoropolyoxyalkylenes terminated with one or more carboxylic groups; salts of sulphonic acids having the formula $R_{f'}$—$C_2H_4SO_3H$, wherein $R_{f'}$ is a perfluoroalkyl $C_4$–$C_{10}$ (see the patent U.S. Pat. No. 4025709); etc.

To adjust the molecular weight of the final polymer, a chain transfer agent can be added to the reaction medium. This can be chosen for instance from: ketones, esters, ethers or aliphatic alcohols having from 3 to 10 carbon atoms, such as acetone, ethylacetate, diethylether, isopropyl alcohol, etc.; chloro(fluoro)carbons, optionally containing hydrogen, having from 1 to 6 carbon atoms, such as chloroform, trichlorofluoromethane, 1,1,1-trifluoro-2,2-dichloroethane (HCFC-123), etc.; bis(alkyl)carbonates in which the alkyl has from 1 to 5 carbon atoms, such as bis(ethyl)-carbonate, bis(isobutyl)carbonate; etc.

The amount of chain transfer agent used can range within very wide limits, depending on the molecular weight meant to be obtained, on the effectiveness of the transfer agent and on the reaction temperature. Such amount is generally comprised between 0.05 and 5%, preferably between 0.1 and 2.4% by weight with respect to the total amount of monomers fed in the reactor.

In the suspension polymerization in the presence of water, stabilizers, for instance polyvinylalcohols, methylcellulose, etc. (U.S. Pat. No. 4,946,900) can be added to the reaction mixture. Mineral oils or paraffins, liquid at the synthesis temperature, can also be used in the emulsion polymerization of the VDF (see U.S. Pat. No. 4,076,929).

The process object of the present invention can be advantageously carried out in the presence of: emulsions or microemulsions of pefluoropolyoxyalkylenes, according to U.S. Pat. No. 4,789,717 and U.S. Pat. No. 4,864,006; microemulsions of fluoropolyoxyalkylenes having hydrogen-containing end groups and/or hydrogen-containing repeating units, according to European patent application EP 625,526, herein incorporated by reference, and microemulsions of fluoropolyoxyalkylens having hydrogen-containing end groups and/or hydrogen-containing repeating units and hydrocarbons $C_1$–$C_{20}$, preferably $C_1$–$C_{12}$, of aliphatic, aromatic or mixed type, optionally containing halogens, preferably chlorine and/or bromine according to the European patent application EP 95117052.1, herein incorporated by reference.

The polymerization reaction can also be carried out, according to a preferred embodiment of the invention, by using a radical photoinitiator in the presence of ultraviolet-visible radiation, both in suspension with or without water or in emulsion/microemulsion, according to European patents EP 650,982 and EP 695,766 in the name of the Applicant, herein incorporated by reference.

The preferred process conditions according to the present invention are generally those in which VDF is in subcritical conditions, i.e. preferably at temperatures <30° C. and at pressures <40 bar.

By "radical photoinitiators" we mean all the chemical species which, subjected to UV-visible radiation, generate radicals capable of starting the (co)polymerization of fluoro-containing olefinic monomers. Among them are comprised: inorganic and organic peroxides, for instance potassium persulphate and diterbutylperoxide, ketones, for instance aetone; acylperoxides, for instance diacetylperoxide; di- or poly-ketones, for instance biacetyl; peroxycarbonates, for instance bis(4-terbutylcyclohexyl)peroxydicarbonate; dialkylsulphides, for instance dimethylsulphide, peroxyesters, for instance terbutylperoxyisobutyrate; complexes of transition metals, for instance pentaamino-chlorocobalt (III) $[Co(NH_3)_5Cl_2]^{2+}$; halogenated or polyhalogenated organic compounds.

From an operating point of view, thermally stable photo-initiators at the polymerization temperature and also at room temperature are preferred, and among them organic or inorganic peroxides, such as potassium persulphate, ammonium persulphate and diterbutylperoxide are particularly preferred.

The following examples are given for illustrative purposes and are not limitative of the present invention.

EXAMPLE 1

(comparative)

On a side wall of a 2 l AISI 316 autoclave, equipped with a stirrer working at 400 rpm, a quartz porthole was inserted, in correspondence of which an Hanau® TQ-150 UV lamp was placed. It is a high pressure mercury lamp which emits radiations comprised between 240 and 600 nm, with a power of 13.2 W for the radiation comprised betwen 240 and 330 nm.

The autoclave was evacuated and there were introduced therein in sequence:

1400 g of demineralized $H_2O$;

15 g of a microemulsion consisting of: 20% by weight of Galden® D02, having the formula:

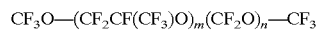

having m/n=20 and average molecular weight of 700;
48% by weight of a surfactant having the formula:

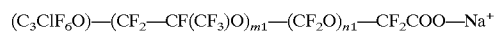

having m1/n1=26.2 and average molecular weight of 525; the remainder being X $H_2O$;

0.8 g of chloroform and 2.8 g of diterbutylperoxide (DTBP).

The autoclave was then brought to 25° C. and to the pressure of 25 absolute bar by the addition of VDF. The UV lamp was then turned on. The initial pressure was maintained constant for the whole reaction by feeding VDF. After 900 minutes, the lamp was turned off and the autoclave vented and discharged at room temperature.

The kinetic parameters (Rp) and the polymer characteristics are shown in the Table.

The second melting temperature was determined by Differential Scanning Calorimetry (DSC). The Melt Flow Index (MFI) was measured at 232° C. with a load of 5 kg according to ASTM D3222-88. The mechanical properties were determined at 23° C. and 150° C. according to ASTM D-1708 and the CHARPY tests were carried out on compression molded plates having a thickness of 2.9–3.1 mm according to ISO 179A standard. The Flexural Creep tests were carried out at 125° C. and 6 MPa of stress. The monomeric composition was determined by $^{19}F$-NMR.

EXAMPLE 2

Example 1 was repeated under the same conditions except that 10 g of TTD were all introduced at the beginning after the DTBP load. After 960 minutes, the lamp was turned off and the autoclave vented and discharged at room temperature. The kinetic parameters (Rp) and the polymer characteristics are shown in the Table.

EXAMPLE 3

(comparative)

Example 1 was repeated under the same conditions except that 16 g of hexafluoropropene (HFP) were all introduced at the beginning after the DTBP load. After 900 minutes, the lamp was turned off and the autoclave vented and discharged at room temperature. The kinetic parameters (Rp) and the polymer characteristics are shown in the Table.

TABLE

| | EXAMPLE 1 (COMP) | EXAMPLE 2 | EXAMPLE 3 (COMP) |
|---|---|---|---|
| Latex (g polym/$H_2O$) | 146.5 | 192 | 162.7 |
| Rp (g/l min.water) | 0.163 | 0.2 | 0.181 |
| MFI (232° C., 5 Kg) | 0.98 | 1.2 | 1.3 |
| Tm (II), ° C. | 177.3 | 176.5 | 170.3 |
| Comonomer, moles % | — | 0.9 (TTD) | 2.2 (HFP) |
| Tensile properties, 23° C. | | | |
| Elastic modulus, MPa | 1646 | 1505 | 1364 |
| Yield Stress | | | |
| MPa | 51.4 | 46.1 | 43 |
| Elongation at yield, % | 7 | 9 | 8 |
| Tensile properties, 150° C. | | | |
| Elastic modulus, MPa | 225.1 | 176.3 | 114.6 |
| Yield stress | | | |
| MPa | 8.7 | 7.4 | 5.2 |
| Elongation at yield, % | 11 | 16 | 15 |
| CHARPY, 23° C. | | | |
| Energy at break (KJ/$m^2$) | 18.2 | 26.1 | 26.8 |
| Flexural Creep, | | | |
| 125° C. 6 MPa | 476 | 405 | 315 |
| 15 s. modulus, MPa | | | |
| 15 s, max strain, % | 1.26 | 1.48 | 1.91 |
| 7 h max strain, % | 1.9 | 2.3 | 3.0 |

From the Table it can be noticed that:

1) At a same viscosity (MFI), the sample containing 0.9% by moles of TTD gives brittle fracture resistance performances similar to the sample modified with 2.2% by moles of HFP, but with mechanical properties clearly superior especially at 150° C.

2) At a same viscosity (MFI), the sample containing 0.9% by moles of TTD has a second melting temperature practically identical to that of the homopolymer with a slight decay of the mechanical properties, however at the same time it shows a notable improvement of the brittleness resistance with respect to the homopolymer.

What is claimed is:

1. Vinylidenfluoride (VDF) thermoplastic copolymers, consisting of:

(a) from 0.5 to 5% by moles of one or more fluorodioxoles of formula:

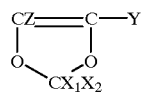

(I)

wherein Y is equal to $OR_f$ wherein $R_f$ is a perfluoroalkyl having from 1 to 5 carbon atoms, $X_1$ and $X_2$, equal to or different from each other, are —F or —$CF_3$; Z is selected from —F, —H, —Cl;

(b) VDF, being the remaining part to 100% by moles.

2. Vinylidenfluoride (VDF) thermoplastic copolymers, according to claim 1, wherein in the component (a) $X_1$, $X_2$ and Z are —F; $R_f$ is —$CF_3$, —$C_2F_5$, —$C_3F_7$.

* * * * *